United States Patent
Cudrnak et al.

(10) Patent No.: US 8,992,091 B2
(45) Date of Patent: Mar. 31, 2015

(54) CLOSURE DESIGN OF A CONDUCTIVE RUBBER MATERIAL FOR ALLOWING CURRENT PASSAGE THROUGH A BEARING IN ELECTRIC MACHINES

(71) Applicant: Schaeffler Technologies AG & Co. KG, Herzogenaurach (DE)

(72) Inventors: Michael Cudrnak, Southbury, CT (US); William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/873,644

(22) Filed: Apr. 30, 2013

(65) Prior Publication Data

US 2013/0301971 A1    Nov. 14, 2013

Related U.S. Application Data

(60) Provisional application No. 61/645,973, filed on May 11, 2012.

(51) Int. Cl.
*F16C 33/76* (2006.01)
*F16C 33/78* (2006.01)
(Continued)

(52) U.S. Cl.
CPC ............. *F16C 33/76* (2013.01); *F16C 33/7816* (2013.01); *F16C 33/7843* (2013.01);
(Continued)

(58) Field of Classification Search
CPC .. F16C 33/76; F16C 33/7843; F16C 2202/32; F16C 2202/52; H02K 7/08; F16J 15/16

USPC ............... 384/477, 478, 482, 484, 907.1; 277/345, 565, 919, 539
See application file for complete search history.

(56) References Cited

U.S. PATENT DOCUMENTS 2,696,170 A * 12/1954 Hill .................. 417/201
3,564,477 A *  2/1971 Pompei ............. 439/17
(Continued)

FOREIGN PATENT DOCUMENTS

DE    697 12 543 T2    8/1997
DE    19710077 A1 *  9/1998 .............. F16K 41/04
(Continued)

OTHER PUBLICATIONS

Annette Muetze, et al "Design Aspects of Conductive Microfiber Rings for Shaft Grounding Purposes" Proc. 42nd IAS Ann. Conf., New Orleans, LA, pp. 229-236, 2007, IEEE 2007.

*Primary Examiner* — Marcus Charles
(74) *Attorney, Agent, or Firm* — Lucas & Mercanti, LLP

(57) ABSTRACT

A bearing seal, which has a rubber body impregnated with an electrically conductive material such as graphite. A level of conductivity of the bearing seal depends upon an amount of graphite integrated into the rubber body. A bearing is also disclosed, which includes at least one closure element, such as a seal, arranged between an outer and inner ring of the bearing that is impregnated with an electrically conductive material, such as graphite, to create a conductive pathway for an electrical current to circumvent the rolling elements of the bearing. The closure element aids in ensuring electric current is kept away from the rolling elements by diverting electric current from the outer ring to the inner ring of the bearing.

12 Claims, 1 Drawing Sheet

(51) Int. Cl.
   *H02K 5/173*   (2006.01)
   *H02K 7/08*    (2006.01)
   *H02K 11/00*   (2006.01)
   *F16C 19/06*       (2006.01)

(52) U.S. Cl.
   CPC ........... *H02K5/173* (2013.01); *H02K 7/08* (2013.01); *H02K 11/0089* (2013.01); *F16C 2380/26* (2013.01); *F16C 19/06* (2013.01); *F16C 2202/32* (2013.01); *Y10S 277/919* (2013.01)
   USPC ........... 384/477; 384/489; 384/490; 277/345; 277/539; 277/919

(56)            References Cited

U.S. PATENT DOCUMENTS

| | | | | |
|---|---|---|---|---|
| 3,655,206 A | * | 4/1972 | Adams | 277/396 |
| 4,341,840 A | * | 7/1982 | Prewo | 428/408 |
| 4,530,609 A | * | 7/1985 | Jasperse et al. | 384/482 |
| 4,753,585 A | * | 6/1988 | Thompson | 418/127 |
| 5,502,143 A | * | 3/1996 | Oie et al. | 528/12 |
| 5,863,135 A | * | 1/1999 | Bildtsen et al. | 384/477 |
| 6,109,794 A | * | 8/2000 | Bertetti et al. | 384/477 |
| 6,508,591 B2 | | 1/2003 | Niwa et al. | |
| 7,193,836 B2 | | 3/2007 | Oh et al. | |
| 7,498,703 B2 | | 3/2009 | Rea, Sr. et al. | |
| 7,498,707 B2 | | 3/2009 | Kimura et al. | |
| 7,784,974 B2 | * | 8/2010 | Baechtiger et al. | 362/295 |
| 2006/0007609 A1 | | 1/2006 | Oh | |

FOREIGN PATENT DOCUMENTS

| | | | | |
|---|---|---|---|---|
| DE | 10329228 A1 | * | 1/2005 | C08J 5/04 |
| DE | 102010014766 A1 | * | 10/2011 | H01R 39/30 |
| FR | 2656902 A1 | * | 7/1991 | F01P 5/10 |
| GB | 905587 A | * | 9/1962 | F16C 27/066 |
| GB | 1395157 A | * | 5/1975 | |
| GB | 1400123 A | * | 7/1975 | |

* cited by examiner

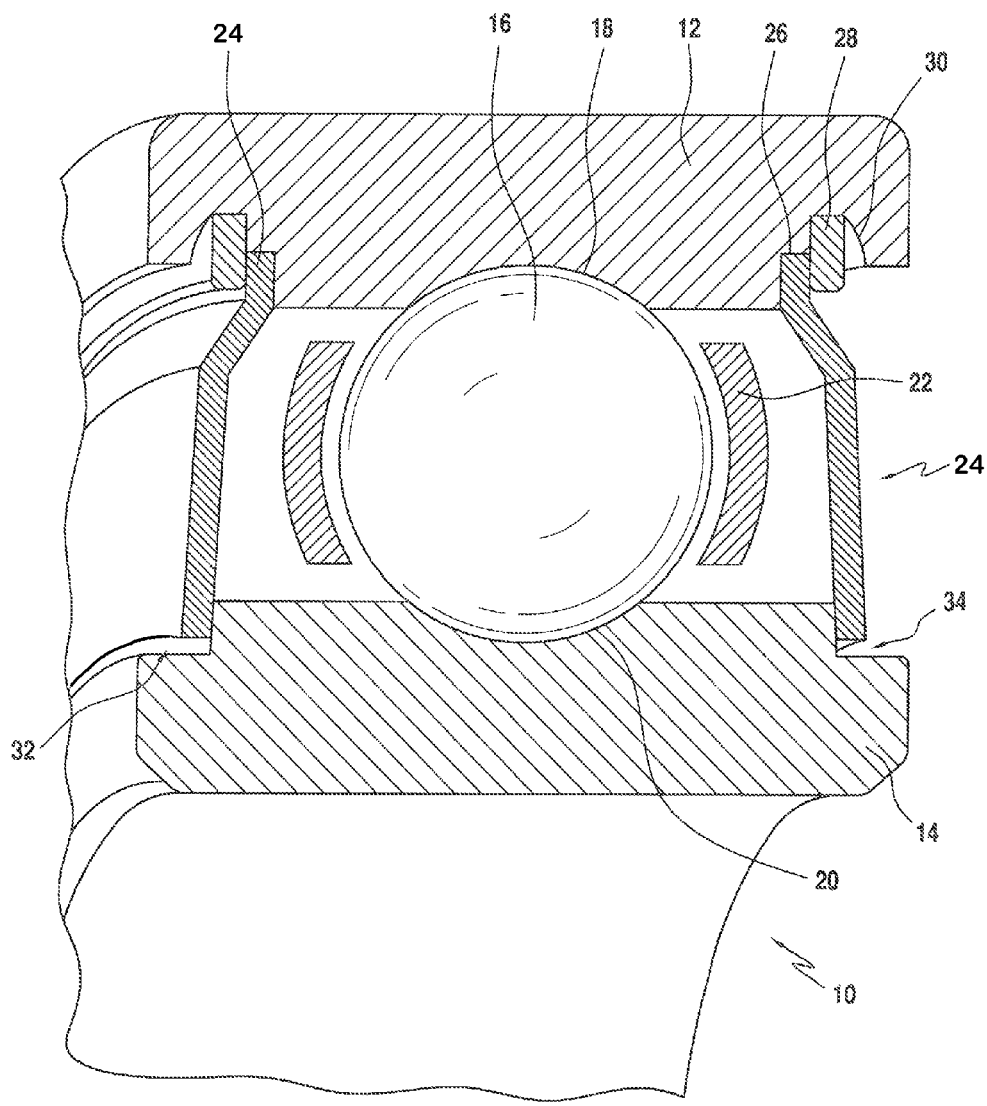

CLOSURE DESIGN OF A CONDUCTIVE RUBBER MATERIAL FOR ALLOWING CURRENT PASSAGE THROUGH A BEARING IN ELECTRIC MACHINES

CROSS-REFERENCE TO RELATED APPLICATIONS

This application claims the priority of U.S. 61/645,973 filed May 11, 2012, which is incorporated by reference herein in its entirety.

FIELD OF INVENTION

The present invention relates to bearings and more particularly to the reduction or elimination of ground shaft electrical currents which pass through rolling elements of bearings used in high speed spindle applications, including electric motors, electric generators, and electric machines.

BACKGROUND OF THE INVENTION

Bearings used in high speed spindle applications, including electric motors, electric generators, and electric machines, are typically comprised of an inner ring and an outer ring, which each have raceways on which rolling elements roll, and cage assemblies.

The passage of electrical currents through bearings is undesirable and can cause damage to the bearing raceways and rolling elements. In some circumstances, the damage caused to bearings can ultimately lead to bearing failure. Damage caused by electric current passing through bearings commonly leads to "fluting." Fluting refers to washboard wear patterns that develop along bearing raceway surfaces in the direction of rotation as a result of a combination of the continuous flow of electric currents and vibrational properties of bearing components.

In addition to damage or failure of bearings, electrical current can affect the machines associated with the bearings. The damage caused by the passage of electric currents can be severe, causing high noise, premature failure, and shutdown of a machine. Also, other machines can be affected negatively through the same stray electrical currents or even small amounts of static electricity. Significant costs and lost revenue can occur as a result of the failure of a machine. In addition to the repair costs associated with the failure of a machine, the costs are compounded by the revenue loss of the machine downtime during repair and resulting production loss.

The electrical currents which are induced onto bearings by machines are difficult to eliminate. However, damage to bearings can be prevented or at least significantly reduced by taking preventative measures. Known preventative measures include current insulating or current conducting ceramic ball bearings, ceramic coated outer bearing rings, electrical conductive grease, or a shaft seal, which is not integrated in a bearing, but rather into a shaft seal unit, with integrated current grounding features.

Bearings using ceramic rolling elements for insulation from electric currents are known. Ceramic has a very high resistance to passage of electric current, and thus these bearings typically exhibit a higher resistance to the passage of electric currents than standard bearings. However, ceramic rolling elements do not ensure electric currents will not lead to bearing failure. Electric currents can jump given enough potential and cause damage to the bearings. Moreover, ceramic rolling elements are expensive.

Alternatively, see, for example. U.S. Pat. No. 6,508,591, which discloses conductive ceramic rolling elements made of conductive material. There, conduction is limited to only the rolling element, which is undesirable. Also, similar to the insulating ceramic rolling elements, the process of manufacturing a rolling element of conducting material is expensive.

Moreover, bearings utilizing ceramic coated outer rings for current insulation are known. However, the process of applying an insulating ceramic coating to the outer ring is expensive and the layer of coating can wear down. Also, insulation is limited to only the outer ring, not the entire bearing.

Bearings utilizing electrical conductive grease are also known. However, grease has undesirable properties, when used as a lubricant, primarily carbon particles, that interfere with the bearing function and act like contaminants. Moreover, electrical conductive grease does not provide satisfactory current conduction of electrical currents in most cases.

Additionally, see, for example, U.S. Pat. No. 7,498,707, which discloses a shaft seal with integrated current grounding elements or brushes that form an electrically conductive path between a shaft and an electrical ground to thereby dissipate residual current and/or stray shaft voltage. Here, the seal is installed, independent of the bearings on the shaft, between a housing and a stator. The seal is not integrated into the bearings. Thus, additional space is required to include the seal in the application and the seal does not prevent the transmission of electrical current via a bearing. See also, U.S. Patent Publication No. 2006/0007609, which relates to a shaft current control brush ring assembly for another example of a shaft seal.

Moreover, other shaft seals are known, which utilize carbon brushes that have electrically conductive carbon graphite for shaft and current grounding. A graphite film typically is deposited on a contact area of carbon brushes during sliding. However, it is commonly known carbon brushes experience excessive wear and hot-spotting/thermal molding and brush dusting/low humidity lubrication.

Furthermore, bearings utilizing slip rings, dissipative brushes, and non-conducting bearing closure elements, such as shields or seals, are known. However, incorporating dissipative brushes into a bearing requires the width of the bearing to be increased. Also, wear from slip rings is undesirable and must be absolutely minimized or kept away from the bearing. Finally, existing bearing closure elements do not contain current insulating or conducting features.

SUMMARY OF THE INVENTION

The present invention is directed to a closure element, such as a seal, that is impregnated with graphite or a similar material to create a conductive pathway for an electrical current to circumvent rolling elements of a bearing. Depending on the amount of graphite integrated into the closure element, different levels of conductivity can be obtained. The closure element is arranged between an outer ring and an inner ring of the bearing to direct electrical current through the bearing, but not through the roiling elements. More specifically, the closure element aids in ensuring electric current is kept away from the rolling elements by diverting electric current from the outer ring to the inner ring of the bearing and onto a shaft of an associated machine.

In addition to transmitting electrical current away from the rolling elements, the closure element provides protection from contaminants and the retention of lubricant(s). It should be noted that, the closure element can be used for moderate speed applications since the closure element makes only light rubbing contact with the inner ring, and the closure element creates only negligible wear and a negligible effect on bearing torque.

Broadly, the present invention can be defined as a bearing seal, which has a rubber body impregnated with an electrically conductive material such as graphite. A level of conductivity of the bearing seal depends upon an amount of graphite integrated into the rubber body.

Also, the present invention can he defined as a bearing comprising an outer ring which has a raceway, an inner ring Which has a raceway, rolling elements arranged between the raceways, and a conductive closure element. The conductive closure element, which can be a seal, is impregnated with an electrically conductive material, such as graphite, and arranged between the outer ring and the inner ring so as to form a pathway for the electrical current to circumvent the rolling elements. The level of conductivity of the conductive closure element depends upon an amount of electrically conductive material integrated into the seal.

In one embodiment, the outer ring has notches formed in an inner surface of the outer ring, on each side of the raceway of the outer ring, and the conductive closure element is secured in one of the notches of the outer ring.

In another embodiment, two conductive closure elements are arranged between the outer ring and the inner ring on opposite sides of the rolling bodies.

In a further embodiment, the conductive closure elements are secured in both of the notches of the outer ring.

In yet another embodiment, the outer ring has grooves formed in the inner surface of the outer ring, adjacent to the notches of the outer ring and snap wire can he arranged in one of the grooves to secure the conductive closure element in the one of the notches of the outer ring or snap wire can be arranged in both of the grooves of the outer ring to secure the closure elements in both of the notches of the outer ring.

In an even further embodiment, the inner ring has notches formed in an outer surface of the inner ring, on each side of the raceway of the inner ring, to provide a surface for the conductive closure element to contact the inner ring axially and allow electrical current to he transmitted from the outer ring to the inner ring.

BRIEF DESCRIPTION OF THE DRAWINGS

The present invention will be further understood and appreciated by reading the following description in conjunction with the accompanying drawing, in which:

The FIGURE illustrates a cross-sectional view of a bearing, which includes a seal with current conducting properties.

DETAILED DESCRIPTION OF THE INVENTION

Referring now to the drawing, the FIGURE shows a cross-sectional view of a bearing 10. The bearing 10 has an outer ring 12, an inner ring 14 and rolling elements 16 arranged between the outer ring 12 and the inner ring 14. The rolling elements 16 roll on raceways 18, 20 formed in the outer ring 12 and the inner ring 14 and are secured by a cage 22. The rolling elements 16 are protected from electrical currents by a closure element 24 that is secured in a notch 26 in the outer ring 12 using a snap wire 28 or similar means that is fixed in a groove 30 adjacent to the seal 24. The inner ring 14 has notches 32, 34 on each side of the raceway 20 against which the closure element 24 contacts. The closure element 24 aids in ensuring that electric current is kept away from the rolling elements 16 by diverting electric current from the outer ring 12 to the inner ring 14 of the bearing 10 and onto a shaft of an associated machine (not shown).

The closure element 24 shown in the FIGURE is a seal. Preferably, two seals 24 are used and arranged on each side of the rolling elements 16. The seal 24, which is preferably made of rubber, is impregnated with graphite or other material to provide a conductive pathway to divert electrical current away from the rolling elements 16.

The present invention has been described with reference to a preferred embodiment. It should be understood that the scope of the present invention is defined by the claims and is not intended to be limited to the specific embodiment disclosed herein.

Reference Characters

10 Bearing
12 Outer Ring
14 Inner Ring
16 Rolling Elements
18 Raceway
20 Raceway
22 Cage
24 Seal
26 Notch
28 Snap Wire
30 Groove
32 Notch
34 Notch

What is claimed:

1. A bearing seal, comprising:
   a rubber body impregnated with graphite and configured to provide a conductive path between an outer ring and an inner ring of a bearing, thereby circumventing rolling elements of the bearing.

2. The bearing seal of claim 1, wherein a level of conductivity of the bearing seal depends upon an amount of graphite integrated into the rubber body.

3. A bearing, comprising:
   an outer ring having a raceway;
   an inner ring having a raceway;
   rolling elements arranged between the raceways; and
   a conductive closure element comprising a bearing seal according to claim 1, arranged between the outer ring and the inner ring so as to form a pathway for the electrical current to circumvent the rolling elements.

4. The bearing of claim 3, wherein the outer ring has notches formed in an inner surface of the outer ring, on each side of the raceway of the outer ring, and the conductive closure element is secured in one of the notches of the outer ring.

5. The bearing of claim 4, wherein two conductive closure elements are arranged between the outer ring and the inner ring on opposite sides of the roiling bodies.

6. The bearing of claim 5, wherein the conductive closure elements are secured in both of the notches of the outer ring.

7. The bearing of claim 5, wherein the outer ring has grooves formed in the inner surface of the outer ring, adjacent to the notches of the outer ring.

8. The bearing of claim 7, further comprising a snap wire, which is arranged in both of the grooves of the outer ring to secure the closure elements in both of the notches of the outer ring.

9. The bearing of claim 4, wherein the outer ring has grooves formed in the inner surface of the outer ring, adjacent to the notches of the outer ring.

10. The bearing of claim 9, further comprising a snap wire, which is arranged in one of the grooves to secure the conductive closure element in the one of the notches of the outer ring.

11. The bearing of claim 3, wherein a level of conductivity of the seal depends upon an amount of graphite integrated into the seal.

12. The bearing of claim 3, wherein the inner ring has notches formed in an outer surface of the inner ring, on each side of the raceway of the inner ring, to provide a surface for the conductive closure element to contact the inner ring axially and allow electrical current to be transmitted from the outer ring to the inner ring.

* * * * *